US010579255B2

(12) United States Patent
Kennedy

(10) Patent No.: US 10,579,255 B2
(45) Date of Patent: Mar. 3, 2020

(54) COMPUTER APPLICATION FOR POPULATING INPUT FIELDS OF A RECORD

(71) Applicant: International Business Machines Corporation, Armonk, NY (US)

(72) Inventor: John Kennedy, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 15/428,486

(22) Filed: Feb. 9, 2017

(65) Prior Publication Data

US 2018/0225038 A1    Aug. 9, 2018

(51) Int. Cl.
*G06F 3/0488* (2013.01)
*G06F 3/0484* (2013.01)
*G06F 17/24* (2006.01)

(52) U.S. Cl.
CPC ...... *G06F 3/04883* (2013.01); *G06F 3/04842* (2013.01); *G06F 17/243* (2013.01)

(58) Field of Classification Search
CPC ..... G06F 3/04883; G06F 17/243; G06F 17/21
See application file for complete search history.

(56) References Cited

U.S. PATENT DOCUMENTS

| 8,707,199 B2 | 4/2014 | Smith |
| 2010/0070877 A1 | 3/2010 | Scott et al. |
| 2013/0159878 A1* | 6/2013 | Kim ................. G06F 3/048 715/752 |
| 2014/0038160 A1 | 2/2014 | Shani et al. |
| 2015/0019997 A1* | 1/2015 | Kim .................. G06F 3/04842 715/752 |
| 2015/0118661 A1 | 4/2015 | Haruta et al. |

* cited by examiner

*Primary Examiner* — Andrea C Leggett
(74) *Attorney, Agent, or Firm* — William H. Hartwell; Hunter E. Webb; Keohane & D'Alessandro PLLC

(57) ABSTRACT

An application executable on a computing device having a display, a memory and a processor is provided. The application creates a blank record having a plurality of unpopulated input fields. The display displays multiple lines of text in another application. The input fields are then populated by repeated execution of first and second user interface commands. The processor interprets the first command so as to mark a text portion extending along at least part of at least one line of the text, and the second command so as to populate one of the input fields based on the marked text portion. Once the input fields are populated the now populated record can be saved through a third user interface command.

19 Claims, 19 Drawing Sheets

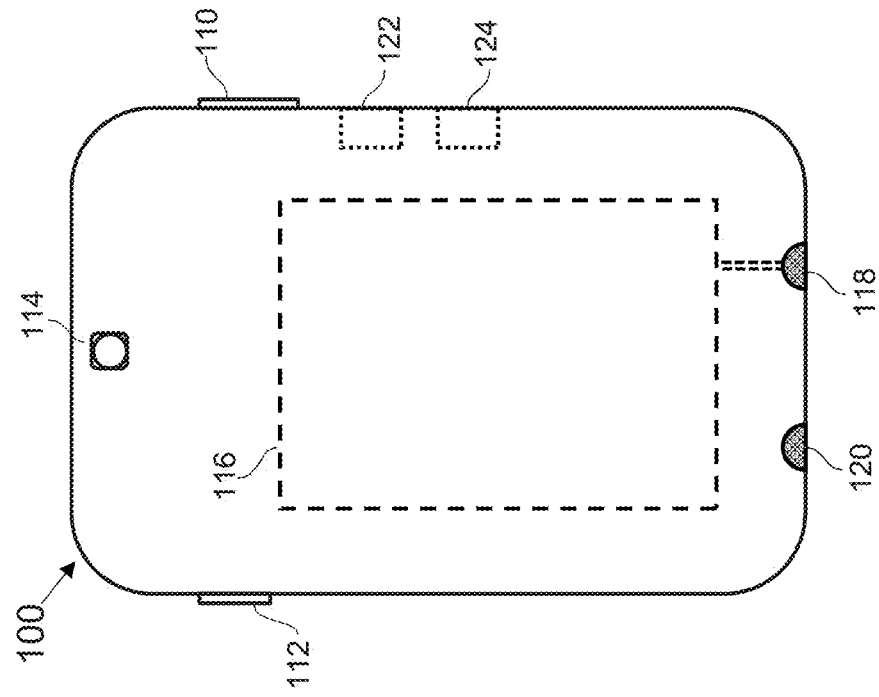
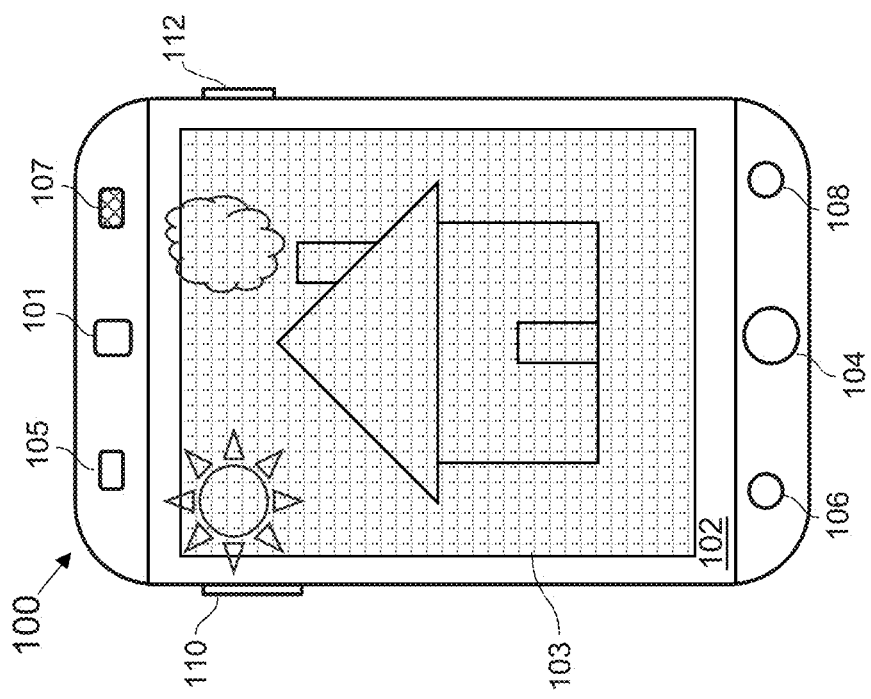

Fig. 9

[01-07-2016] [START TIME] [END TIME] [SUBJECT] [DESCRIPTION] [LOCATION] [INVITEES] [ATTACH_S]

Meeting appointment

This will be a meeting on Friday, 1st July

Mr and Mrs Smith will be attending, but you are welcome to invite other interested parties.

It will be held in Conference Room A.

The start time 9:00 am and it should last for about

The matter refers to the proposed planning scheme on Main Street. Other points are given in an attachment, principally the meeting will refer to the points raised on pages 40-41 of this document.

SAVE

Fig. 10

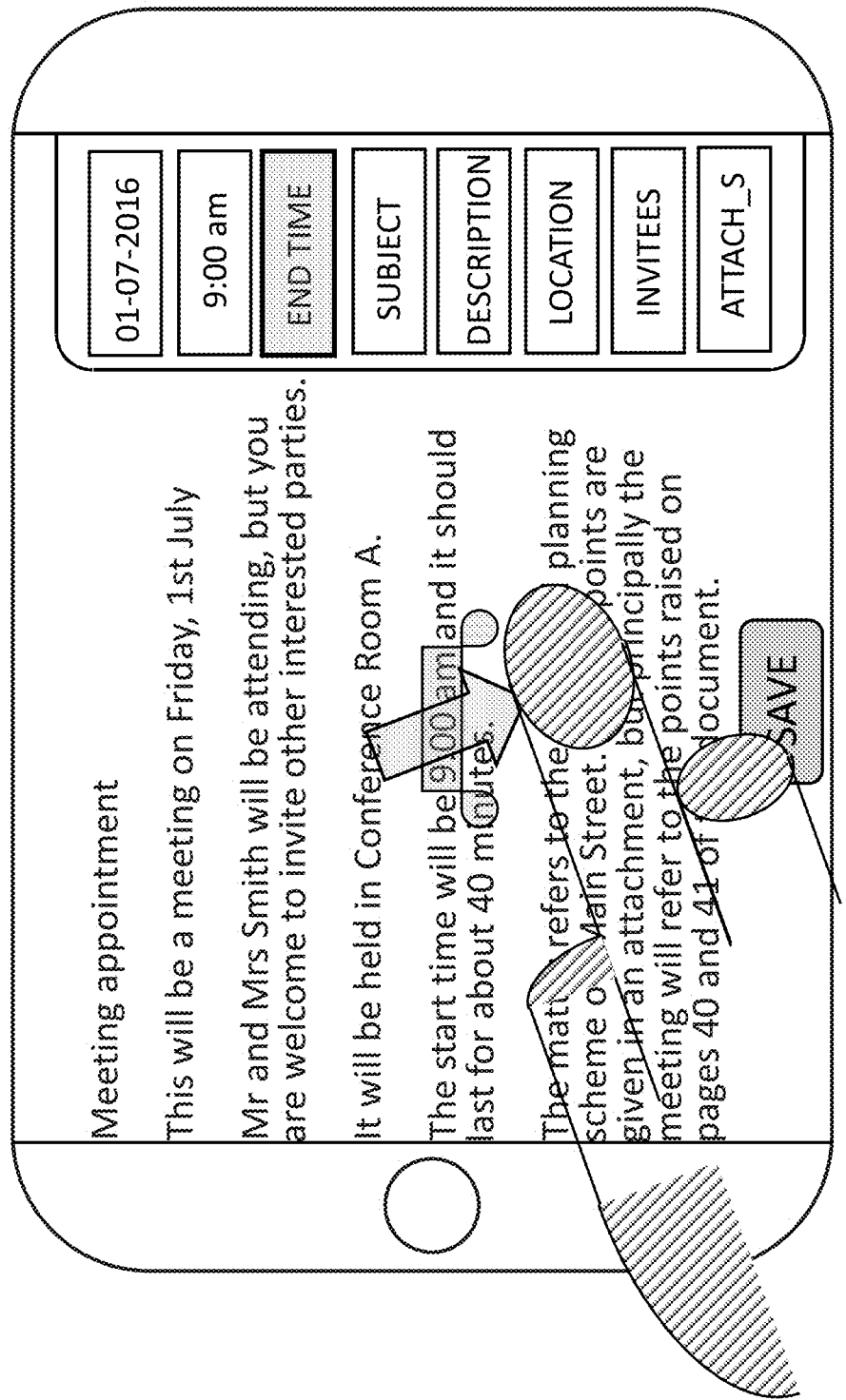

Fig. 12

Meeting appointment

This will be a meeting on Friday, 1st July

Mr and Mrs Smith will be attending, but you are welcome to invite other interested parties.

It will be held in Conference Room A.

The start time will be 9:00 am and it should last for about 40 minutes.

The matter refers to the proposed planning scheme on Main Street. Further points are given in an attachment, but principally the meeting will refer to the points raised on pages 40 and 41 of this document.

01-07-2016 | 9:00 am | END TIME | SUBJECT | DESCRIPTION | LOCATION | INVITEES | ATTACH_S

SAVE

Fig. 13

Meeting appointment

This will be a meeting on Friday, 1st July

Mr and Mrs Smith will be attending, but you are welcome to invite other interested parties.

It will be held in Conference Room A.

The start time will be 9:00 am and it should last for about 40 minutes.

The matter refers to the proposed planning scheme on Main Street. Further points are given in an attachment, but principally the meeting will refer to the points raised on pages 40 and 41 of this document.

01-07-2016
9:00 am
END TIME
SUBJECT
DESCRIPTION
Con
INVITES
ATTACH_S

SAVE

COMPUTER APPLICATION FOR POPULATING INPUT FIELDS OF A RECORD

TECHNICAL FIELD

The present disclosure relates to a computer application executable on a computing device for populating input fields of a record.

BACKGROUND

In the information technology environment of today the extraction of relevant information is increasingly important. Much of the information received in an IT environment is in the form of unstructured data. For example, a colleague may send an email or other text-based communication about a meeting that includes the date, time, venue, duration, subject, etc. However, transferring these details into a format that is useful to the user (e.g., a calendaring application) can be time consuming. This can be further complicated if the receipt and transferring is performed on a handheld device.

BRIEF SUMMARY OF THE INVENTION

According to a first aspect of the disclosure, there is provided an application executable on a computing device having a display, a memory and a processor. The application is operable to: create a blank record having a plurality of unpopulated input fields; display on the display multiple lines of text in another application; and populate the input fields in the record. The input fields are populated by: detecting a first user interface command which the processor interprets as a command to mark a text portion extending along at least part of at least one line of the text; detecting a second user interface command which the processor interprets as a command to populate one of the input fields based on the marked text portion; iterating the detecting of the first and second user interface commands; detecting a third user interface command to save the record; and saving the record.

In some embodiments, the display is a touchscreen.

In some embodiments, the second user interface command is a gesture. The second user interface command can be a swipe gesture, in particular a swipe in a direction that crosses the marked text portion. The third user interface command can be a touch command or some other command such as a voice command.

The application in some embodiments is a database application, in which case the record once created becomes one of a plurality of records saved in the database. A calendar application is an example database application. An application related to a calendar application, which is the subject of another embodiment is a to-do list or task list application. In other embodiments, the application could be a form filling application, in which case the record is a form. The application could be any application requiring input fields to be populated.

In particular, in one embodiment, the application is a calendar application, in which the database records are calendar entries. Specifically, according to one embodiment of the first aspect of the disclosure, there is provided a calendar application executable on a computing device having a touchscreen display, a memory and a processor. The calendar application is operable to: store in the memory a plurality of entries in the calendar, each calendar entry being defined by a plurality of calendar entry input fields, at least some of which are mandatory; display on the touchscreen display multiple lines of text in another application; and create a calendar entry. The calendar entry is created through: detecting a first gesture which the processor interprets as a command to mark a text portion extending along at least part of at least one line of the text; detecting a second gesture in the form of a swipe in a direction that crosses the marked text portion which the processor interprets as a command to populate one of the calendar entry input fields based on the marked text portion; iterating the detecting of the first and second user interface commands; detecting a user touch command to save the calendar entry; and saving the calendar entry.

In some embodiments, detection of at least one of the first and second gestures causes the application to additionally display on the touchscreen the plurality of input fields. The processor is preferably operable to visually indicate which of the input fields is currently designated as being the next to populate. In certain embodiments, each of the input fields has a formatting requirement. Detecting the second user interface command, such as the second gesture, triggers the processor to populate the currently selected input field, conditional on the marked text portion being compatible with the formatting requirement of the currently selected input field. Moreover, if following a second user interface command, such as the second gesture, the processor determines that the marked text portion is not compatible with the formatting requirement of the currently selected input field, then the processor can be programmed with various options, one of which is to search for an unpopulated input field that is compatible, and if there is one, to select that input field. If the user then executes the second gesture again, it will now populate the newly selected input field.

In some embodiments, during the iterative detection of the first and second user interface commands to populate the input fields, the processor is operable such that ones of the input fields that are populated display their content, and ones of the input fields that are not populated display a prompt for input. For example, an as-yet unpopulated input field may display its field name, e.g. SUBJECT, or a blank format, e.g. a blank date format such as 'DD-MM-YY'.

It is useful if the user also has the ability freely to select a particular input field. This can, for example, be done by a touch input, wherein detection of a tap on the touchscreen of a particular input field selects that input field.

Sub-menus specific to at least some of the input fields can also be launched as follows. Detection of a sustained, i.e. prolonged, touch on the touchscreen of a particular input field, sustained beyond a threshold time (which is longer than any threshold time for the tap used for selecting the input field), causes display of a submenu for that input field providing further options, wherein the further options may be input options or other options, such as who to notify of, or invite to join, a meeting.

The first gesture may conveniently be in the form of a swipe in the direction of flow of a line of the text that is interpreted as a command to mark the text portion coincident with the swipe. For Latin and Germanic languages this will be left-to-right; for Arabic or Hebrew, right-to-left; and for Mandarin, Korean and Japanese could be top-to-bottom or right-to-left depending on the script. Other gestures could be used as the first gesture. Moreover instead of or as well as gestures, non-gesture based commands may be provided for, e.g. voice commands, or keyboard commands.

The second gesture is intended to be a swipe crossing the marked text portion. The marked text portion has a direction defined by the direction of flow of the text. This direction is to be compared with the direction of the crossing swipe gesture. The application can define what constitutes a crossing by computing the angle between the second gesture and the marked text flow direction. If the angle is close to a right angle (90 degrees) then the swipe will be recognized as the second gesture. An angular range either side of right angle can be defined, which may be symmetric or asymmetric from the right angle. A suitable angular range might be 90±X degrees, where X is selected from the group 20, 30, 40, 50, 60, 70 degrees. The range might take account of whether the user is left or right handed and thus be asymmetric. As well as specifying what angles of crossing constitute a second gesture, the application may also impose spatial restrictions on what constitutes a crossing. Namely, the swipe to be interpreted as a second gesture, may be required to physically cross some part of the marked text portion, anywhere within a certain distance of the marked text portion (e.g. just beyond either end is also a valid second gesture), or perhaps there may be a requirement that the crossing has to be relatively centrally over the marked text portion. Relatively centrally might mean over the central third or half of the marked text portion, i.e. not near to the ends. It will be understood that how to specify the second gesture is within the scope of the designer and can be optimised based on user testing, for example.

According to a second aspect of the invention there is provided method executed on a computing device having a display, a memory and a processor. The method comprises: creating in one application a blank record having a plurality of unpopulated input fields; displaying on the display multiple lines of text in another application; detecting a first user interface command which causes the processor to mark a text portion extending along at least part of at least one line of the text; detecting a second user interface command which causes the processor to populate one of the input fields based on the marked text portion; iterating the detecting of the first and second user interface commands; detecting a user touch command to save the record; and saving the record.

In particular, in one embodiment, the application is a calendar application, in which the database records are calendar entries. Specifically, according to one embodiment of the second aspect of the invention there is provided a method of executing a calendar application on a computing device having a touchscreen display, a memory and a processor, the calendar application being operable to store in the memory a plurality of entries in the calendar, each calendar entry being defined by a plurality of calendar entry input fields, at least some of which are mandatory. The method comprises: displaying on the touchscreen display multiple lines of text in another application; detecting a first gesture which causes the processor to mark a text portion extending along at least part of at least one line of the text; detecting a second gesture in the form of a swipe in a direction that crosses the marked text portion which causes the processor to populate one of the calendar entry input fields based on the marked text portion; iterating the detecting of the first and second user interface commands; detecting a user touch command to save the calendar entry; and saving the calendar entry.

According to a third aspect of the disclosure, there is provided a computer program stored on a computer readable medium and loadable into the internal memory of a digital computer, comprising software code portions, when said program is run on a computer, for performing the method of the first aspect. According to a fourth aspect there is provided a computer program product storing the computer program of the third aspect.

BRIEF DESCRIPTION OF THE DRAWINGS

In the following, the present invention will further be described by way of example only with reference to exemplary embodiments illustrated in the figures.

FIG. 1A is a schematic view, in accordance with an embodiment, of the front of a handheld touchscreen computing device.

FIG. 1B is a schematic view, in accordance with an embodiment, of the rear of the handheld touchscreen computing device of FIG. 1A.

FIG. 9 shows, in accordance with an embodiment, the user executing a left-to-right swipe gesture over a time-indicating portion of the text to highlight the time.

FIG. 10 shows, in accordance with an embodiment, the situation after FIG. 9 in which the time text is highlighted.

FIG. 11 shows, in accordance with an embodiment, the user executing a down-swiping gesture crossing the highlighted time text which causes the selected 'start time' field of the calendar bezel to be populated with the highlighted time text, and the selected input field to be incremented to the next input field, which is 'end time'.

FIG. 12 shows, in accordance with an embodiment, the user executing a left-to-right swipe gesture over a free-text portion of the text to highlight the meeting venue, i.e. location.

FIG. 13 shows, in accordance with an embodiment, the situation after the user realizes that the selected input field ('subject') does not correspond to the highlighted text ('location text') and thus touches the desired input field icon for 'location' which causes the highlighted location text to populate the location input field.

DETAILED DESCRIPTION

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

A touchscreen computing device as presented herein may for example be a mobile phone (smartphone), phablet, tablet, laptop computer, personal computer, smart television or media player. The computing device may be a user equipment as defined by one or more telecommunications standards. The computing device may be portable, e.g. a handheld computing device, or fixed.

FIG. 1A and FIG. 1B are schematic perspective views from the front and behind of a handheld touchscreen computing device.

Figure 2:
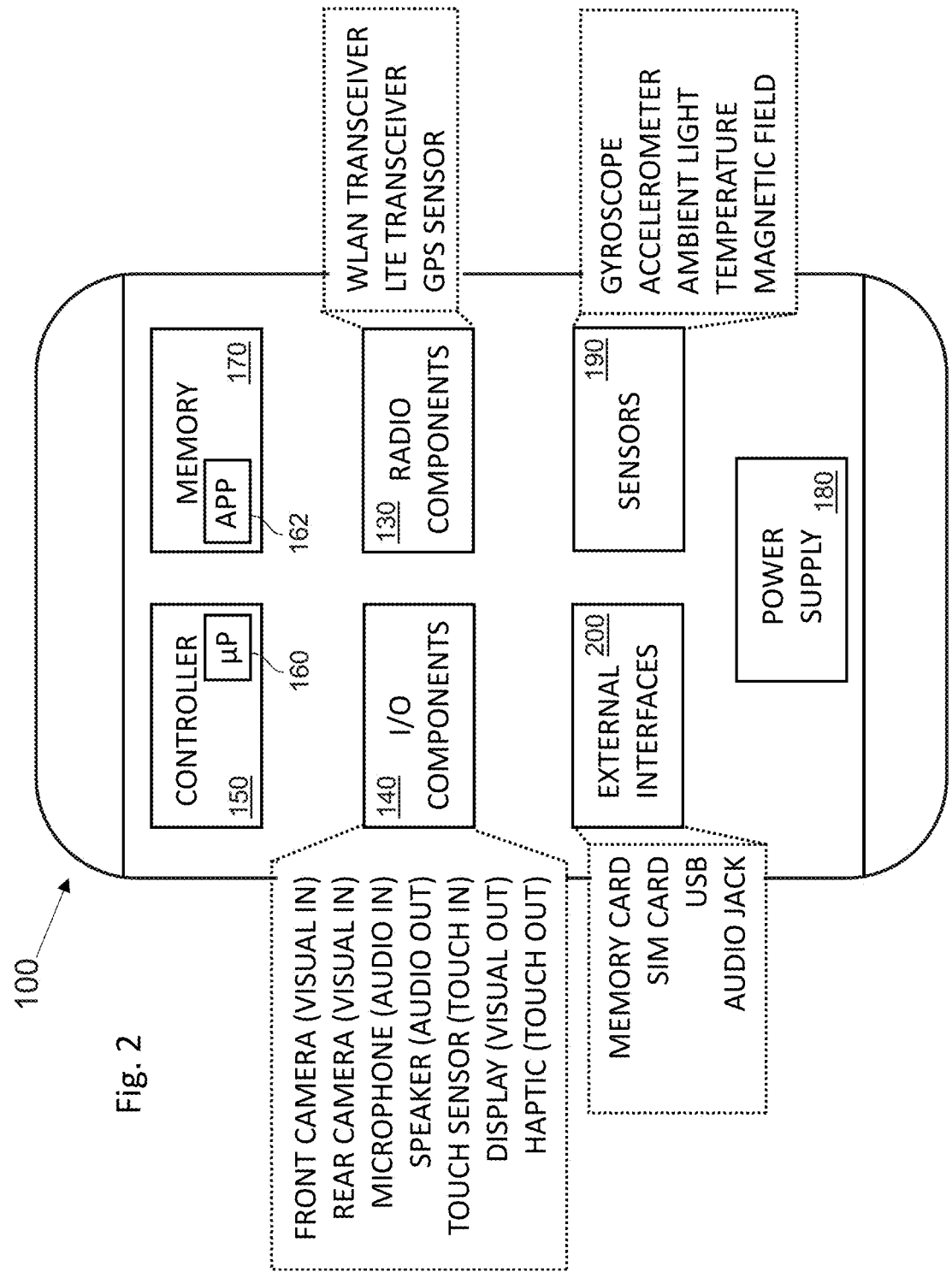
FIG. 2 is a block diagram of the functional components of the computing device of FIG. 1A and FIG. 1B, in accordance with an embodiment.

FIG. 2 is a block diagram of the functional components of the computing device of FIG. 1A and FIG. 1B.

Referring to FIG. 1A, the computing device 100 has a smartphone or tablet format. The computing device 100 is arranged in a housing with a front face (facing outwards from FIG. 1A), a rear face and a bezel forming the edges of a substantially rectilinear object. The front face is mostly taken up with a touch screen display which combines a display 102 (shown displaying a scene with house, smoke and sun) with a touch sensitive area 103 (shown with the hatching). The touchscreen enables the user to input commands to applications running on the computing device through gestures, which vary from the humble single touch of a point on the display to select it, referred to in the art as a tap, and other single touch gestures, such as a swipe, through to multitouch gestures such as the two-finger pinch conventionally used for zooming in and out and rotating. We note that in this document references to gestures means touch gestures on a touchscreen. The front face also accommodates a mechanical key (or button) 104 and two touch sensor keys (or buttons) 106, 108, one either side of the mechanical key 104. The edges of the housing accommodate a mechanical rocker switch 110 for volume control and an on/off switch 112. There is also a haptic layer embedded in the touch screen 102 to provide tactile feedback (not shown).

A front facing camera 101 for capturing stills or video images is arranged on the front face near the top of the housing facing forwards and has adjacent to it a microphone 105 for capturing audio and a speaker 107 for outputting audio.

Referring to FIG. 1B, the rear view, a rear facing camera 114 for capturing stills or video images is arranged near the top of the housing facing backwards. A battery 116 is accommodated within the housing and constitutes a power supply (shown with dashed lines). The power supply further includes an external power input socket 118 which may be used for powering the device as well as charging the battery. Alongside the power input socket 118 at the bottom of the device there is another external connector in the form of an audio jack 120 for audio output. Further external interfaces may be provided including various ports, holders and sockets for physical connections. With dotted lines we show two internal holders 122, 124 which may be for a SIM card and a memory card or further SIM card. The memory card is a kind of data storage device.

Referring to FIG. 2, selected functional components of the computing device 100 are shown. The computing device 100 has radio components 130, input/output (I/O) components 140, a controller 150 associated with a processor 160 and a memory 170, a power supply 180, sensors 190 and external interfaces 200. The memory 170 is operable to store computer applications ('apps') 162 which comprise software code portions that are loadable into and executable by the processor 160.

The processor may comprise separate processing units for specialist tasks such as video processing, speech/audio analysis and/or synthesis. The controller and associated processor have the task of controlling the computing device and executing computer programs stored in the memory. The memory may store computer applications for running on the computing device as well as collecting data from the various I/O devices. The controller typically functions to control overall operation of the computing device, in addition to the operations associated with the application programs. The controller processes signals, data, information and the like input or output through the above-mentioned components and/or runs application programs saved in the memory, thereby processing or providing a user with appropriate information and/or functions.

The radio components 130 includes a WLAN transceiver, an LTE transceiver, and a GPS module. The I/O components 140 include a display capable of displaying content and also acting as part of a graphical user interface, wherein the display may be based on a suitable technology such as liquid crystal or organic light emitting diodes, as well as a position-sensitive touch sensor area overlaid on, or formed as an integral part of, the display to serve as part of a graphical user interface in conjunction with the display with optionally other touch sensor areas or buttons (e.g. on the reverse side or edge (bezel) of the device housing. Further I/O components, as previously mentioned, are front and rear facing cameras for capturing stills or video images, a microphone for capturing audio, a speaker for outputting audio and a haptic output embedded in the touch screen to provide tactile feedback. The sensing components include a gyroscope, an accelerometer, an ambient light sensor and a temperature sensor, for example. The external interfaces may include various ports and sockets for physical connections, such as a SIM card, wired LAN connectors, memory cards, audio jack socket, USB ports and so forth.

Figure 3:
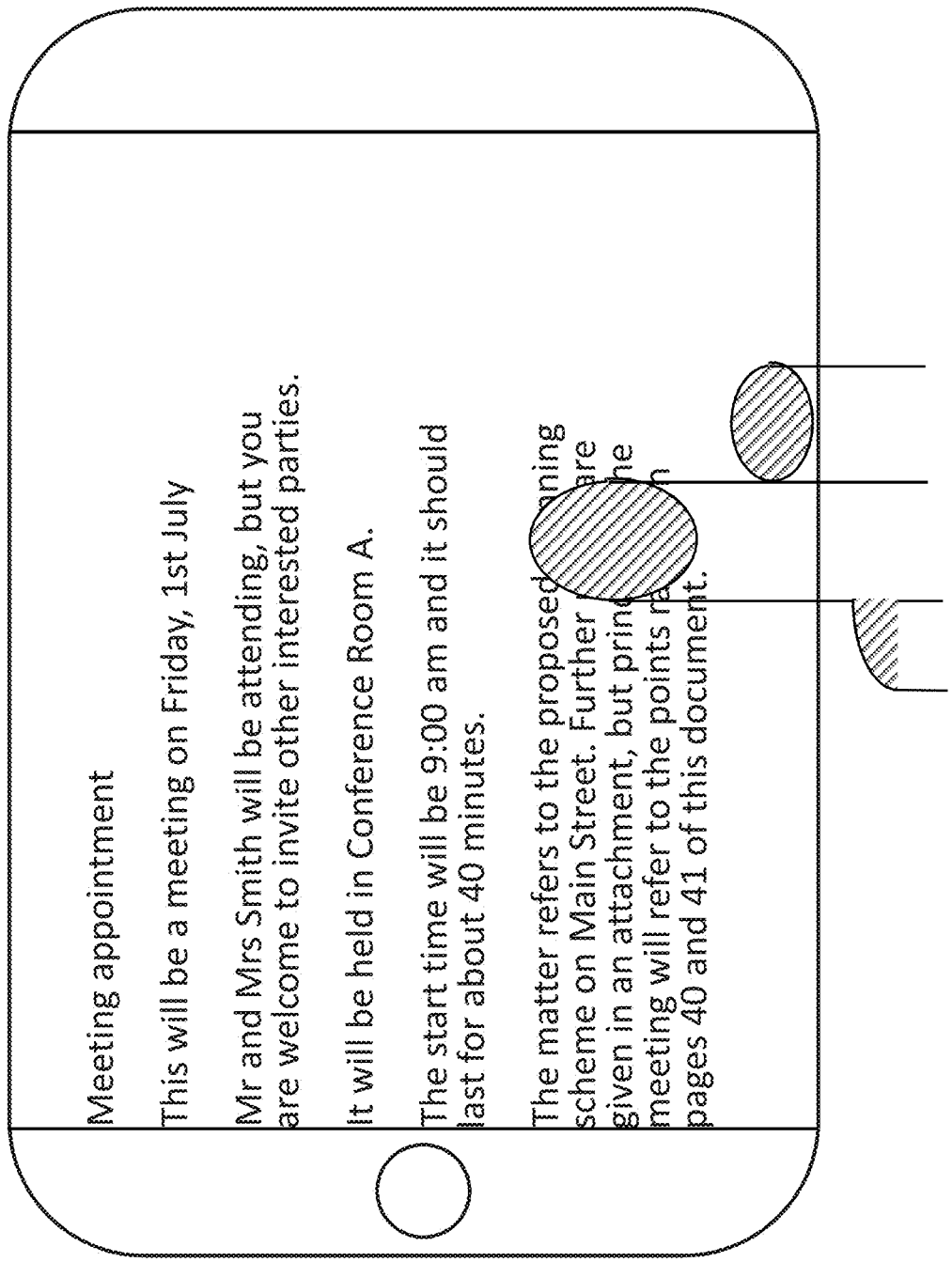
FIG. 3 is a schematic diagram, in accordance with an embodiment, of the device's touchscreen while it is displaying some free text which is being browsed by a user, a part of whose hand is schematically illustrated, a finger being used to scroll the text.

FIG. 3 is a schematic diagram of the device's touchscreen while it is displaying some free text in an arbitrary application. For example, the text may be in a message that is being displayed via a messaging application, an email application, a social media application, or text from a webpage being displayed by a web browser application. The text is being read by a user, a part of whose hand is schematically illustrated; a finger being used to scroll the text with a dragging touch gesture.

Figure 4:
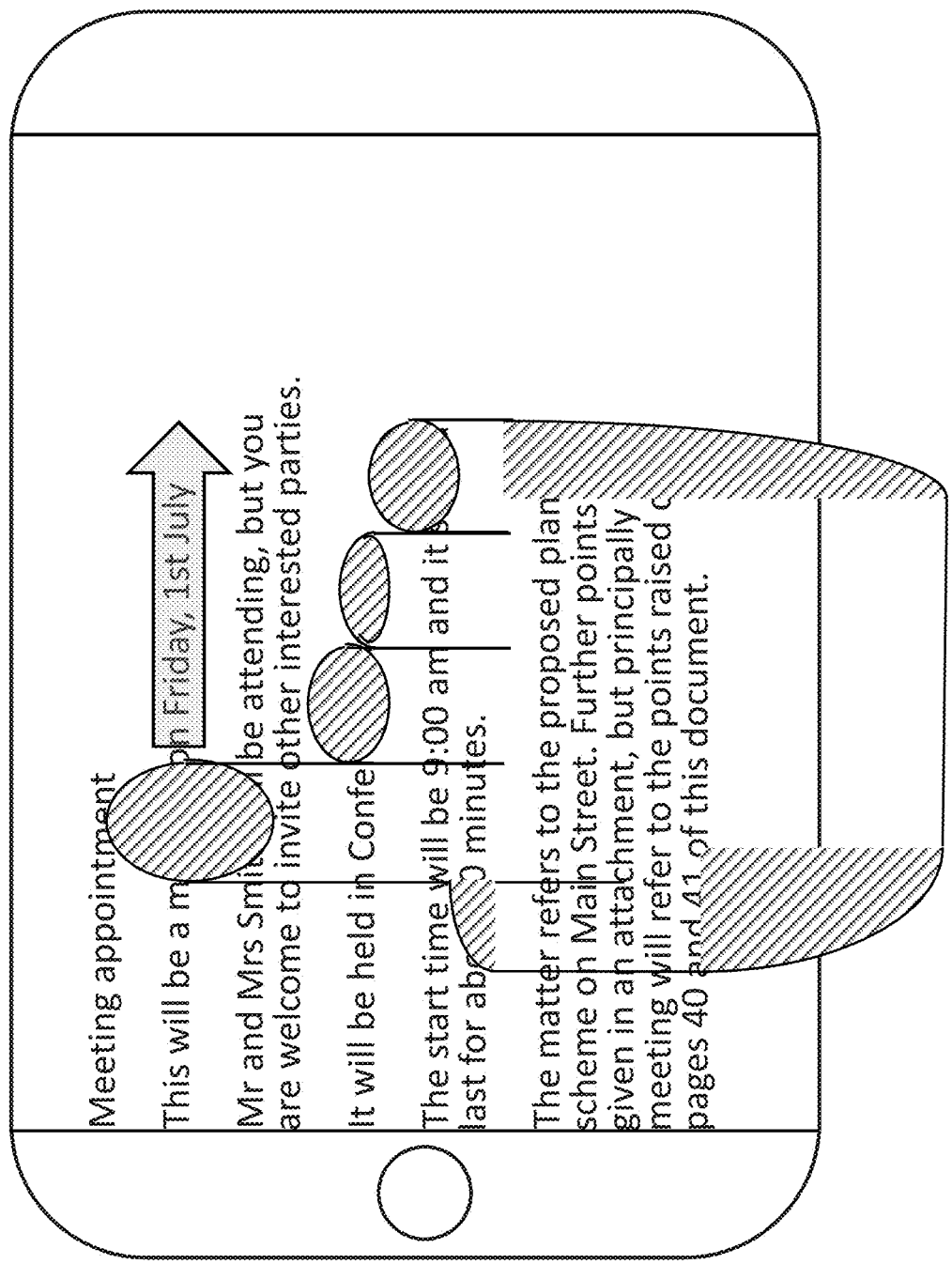
FIG. 4 shows, in accordance with an embodiment, the user executing a left-to-right swipe gesture over a date-indicating portion of the text to highlight the date.

FIG. 4 shows the user executing a left-to-right swipe gesture over a date-indicating portion of the text to highlight the date by touching the touchscreen with a finger tip.

Figure 5:
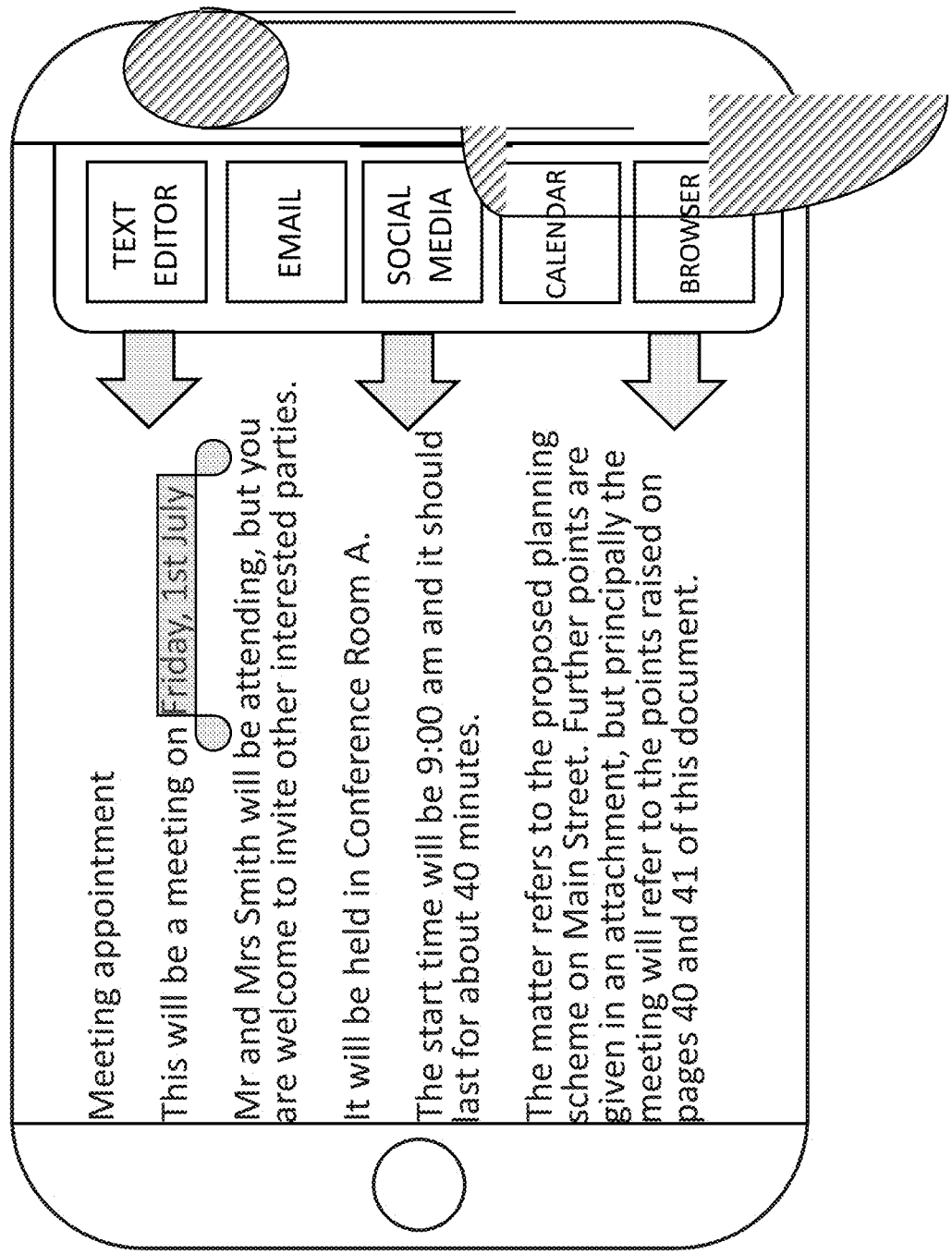
FIG. 5 shows, in accordance with an embodiment, the situation after FIG. 4 in which the date text is highlighted and a menu sidebar or bezel is displayed on the right of the touchscreen.

FIG. 5 shows the situation after FIG. 4 in which the date text is highlighted and a menu sidebar or bezel has emerged from the right of the screen. The emergence of the menu bezel is schematically indicated with the arrows. It is noted that the emerging from the edge of the screen is merely a convenient aesthetic, and the bezel could simply be displayed as a side bar from the screen of FIG. 4 without being moved in from the edge. There are various menu options, each indicated by an icon which functionally is a virtual button which can be pressed by a user tap gesture. The various menu options include a calendar application as well as, by way of example, a text editor, email, social media and a web browser. It will be appreciated that the text may be rescaled following display of the bezel to take account of the reduction of screen area now available for displaying the text in the other application.

Figure 6:
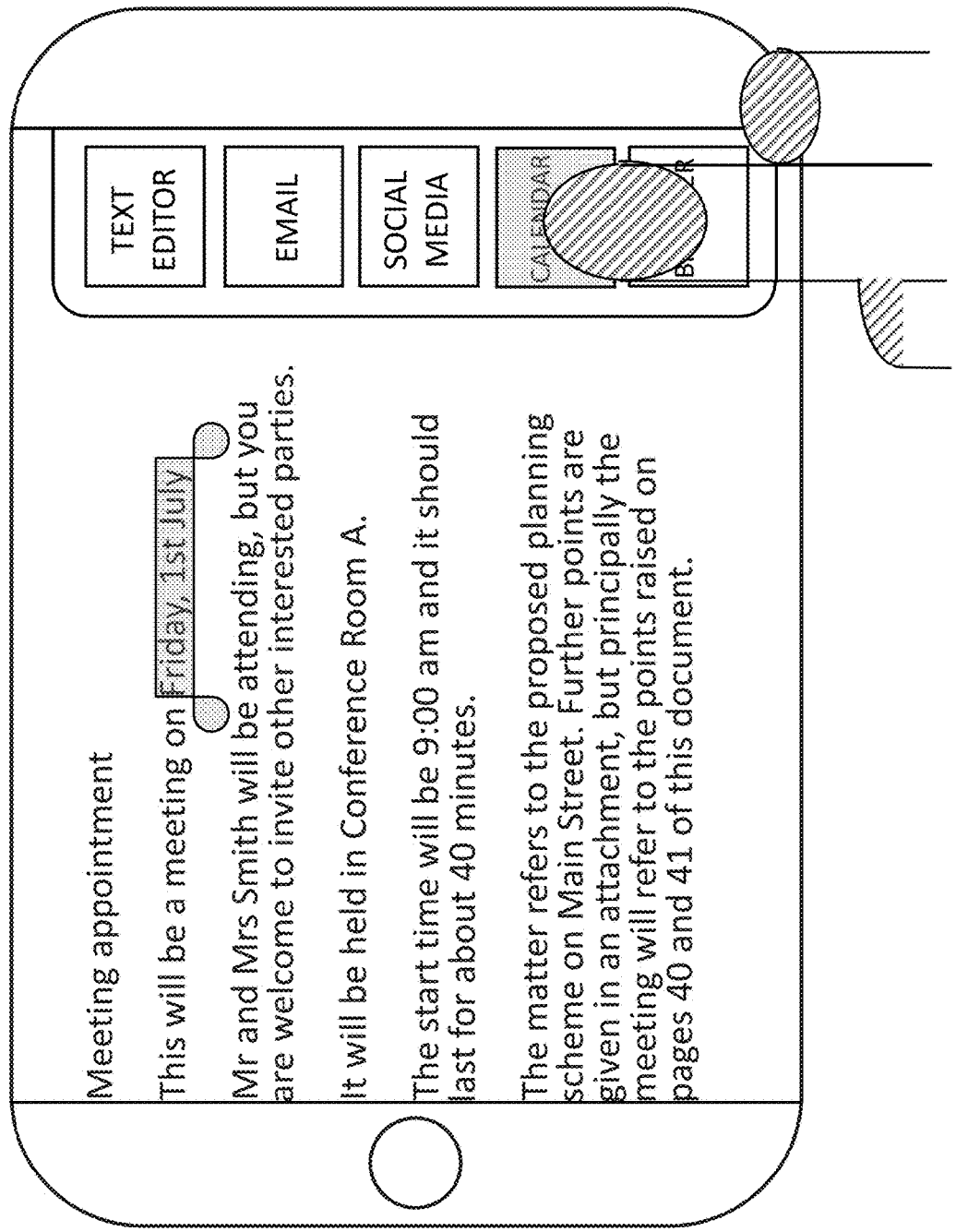
FIG. 6 shows, in accordance with an embodiment, the user selecting by touch a calendar app option from the menu bezel.

FIG. 6 shows the user selecting by touch a calendar app option from the menu bezel using a tap gesture.

Figure 7:
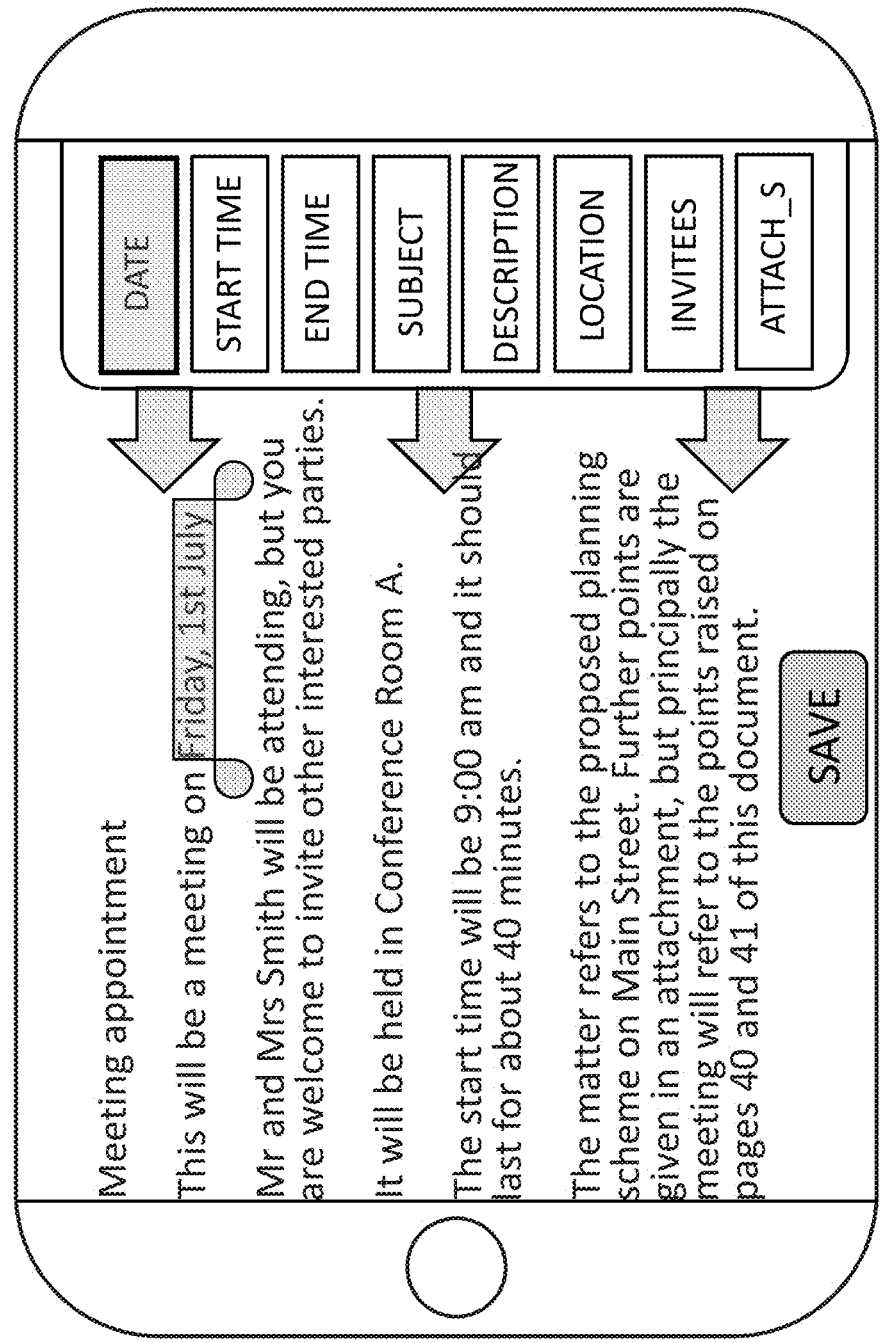
FIG. 7 shows, in accordance with an embodiment, a calendar app sidebar or bezel displayed on the right of the touchscreen together with a 'save' button.

FIG. 7 shows a calendar app input sidebar or bezel that has emerged from the right of the screen. The emergence of the calendar bezel is schematically indicated with the arrows. It is noted that the emerging from the edge of the screen is merely a pleasant and convenient aesthetic. Launching the calendar application has also caused a 'save' button to be displayed, which in the figure is shown at the bottom-centre of the screen, but could be located anywhere convenient. The calendar input bezel displays a number of input fields for a calendar entry. Namely, each calendar entry is defined by a plurality of calendar entry input fields, at least some of which are mandatory. It is preferred that at least all mandatory fields are shown on the bezel, plus optionally if there is space the most important (e.g. commonly populated) non-mandatory fields. In this example, we could say that the first four listed entries are the mandatory fields, that is: date, start time, end time and subject. Further non-mandatory fields can be accessed through submenus as described further below. On the calendar bezel, at any one time one of the input fields may be selected. In FIG. 7, we show the 'date' field as being selected. Its selection is indicated by the bold border around the button. (The same convention is used in the subsequent figures.) Other visual indications of which of the calendar entry input fields is currently designated as being the next to populate are possible, e.g. using color, shading etc. It is noted that the calendar application on launch of the bezel has logic which selects the first-listed input field, i.e. the date field in this example.

Figure 8:
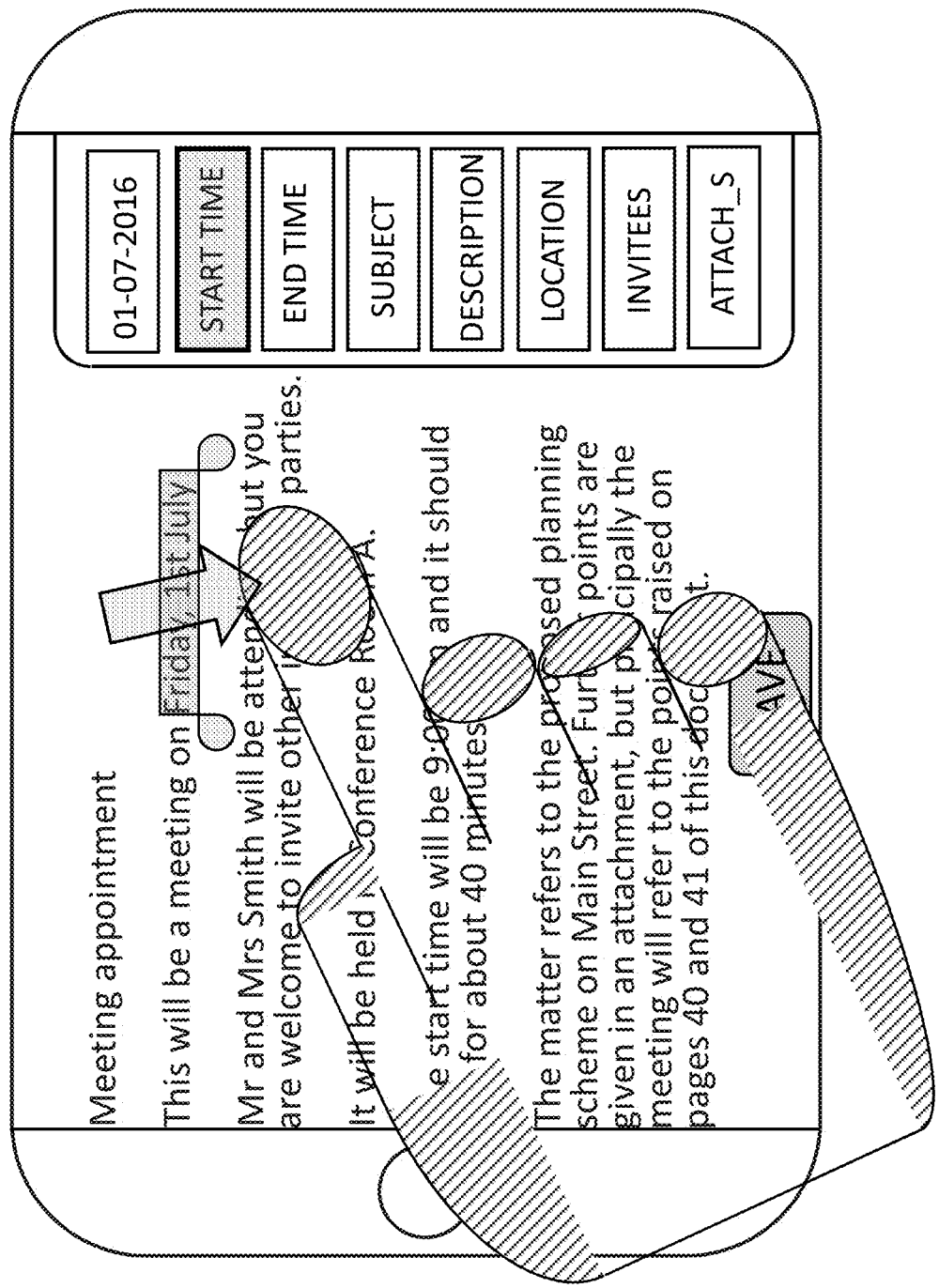
FIG. 8 shows, in accordance with an embodiment, the user executing a down-swiping gesture crossing the highlight date text which causes the selected 'date' field of the calendar bezel to be populated with the highlighted text, and the selected input field to be incremented to the next input field, which is 'start time'.

FIG. 8 shows the user executing a down-swiping gesture crossing the date text which causes the selected date field of the calendar bezel to be populated with the highlighted text, and the selected input field to be incremented to the next input field, which is 'start time'. This gesture in the form of a swipe is in a direction that crosses the marked text portion, which the application interprets as a command to populate the currently selected calendar entry input field (in this case 'date') based on the marked text portion. We say based on, since there need not be a one-to-one correspondence. Rather the application knows the format the selected input field is looking for and extracts from the marked text the relevant content. In this case, the highlighted text is "Friday, 1st July" and the date format also requires a year. The logic in the calendar application can recognize this text as expressing a date and moreover can assume that, absent a year being specified, the current year should be taken. Another test could be whether 1st July is a Friday for the current year, i.e. a consistency check for the day and date. A failure to be able to populate the selected input field with the marked text following the down-swipe gesture, could be dealt with in different ways. One option would be for the application to search for an unpopulated input field that is compatible with the format of the marked text, and if there is such an input field, select it, so that if the user executes the second gesture again, it will now populate the newly selected input field. Another option would be to cause a keypad or keyboard to pop-up through which the user can populate the selected input field manually using tap gestures, e.g. in this case a numeric keypad to enter the date, or in other cases with text fields a keypad with letters or a full keyboard. Alternatively, it could simply result in no action, other than perhaps to indicate to the user that there was a failure, e.g. through a visual indication, or haptic feedback with a vibration of the device. In FIG. 8, it is shown that the date field has been populated following the down-swipe gesture, and that as a consequence the selected input field has been incremented to the next field, in this case 'start time'. It will thus be understood that, generally speaking, each of the input fields has a formatting requirement and population of the currently selected input field following detection of a population command is conditional on the marked text portion being compatible with the formatting requirement of the currently selected input field.

FIG. 9 shows the user executing a left-to-right swipe gesture over a time-indicating portion of the text to highlight the time.

Figure 10:
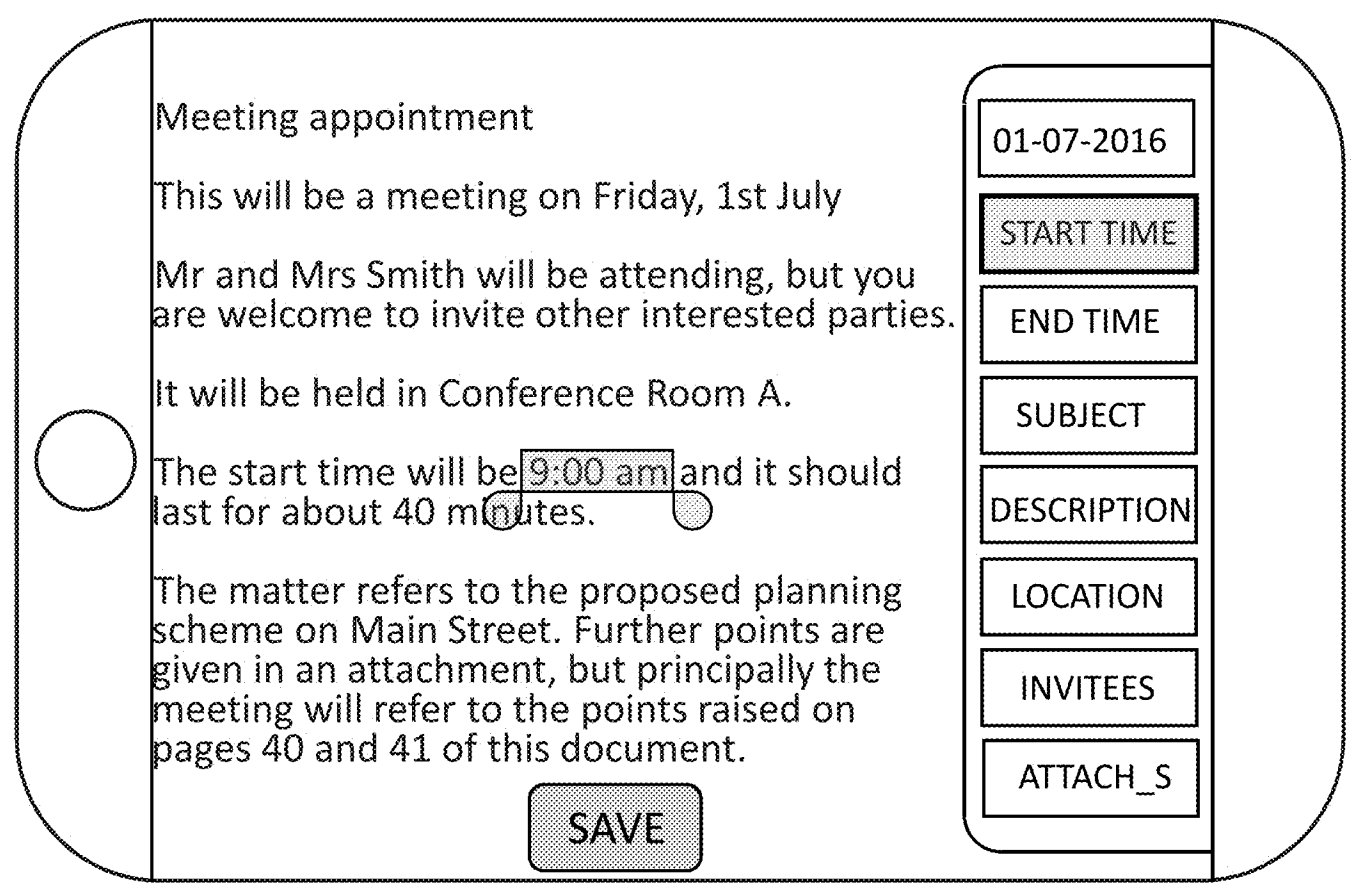

FIG. 10 shows the situation after FIG. 9 in which the time text is highlighted.

FIG. 11 shows the user executing a down-swiping gesture crossing the highlighted time text which causes the selected start time field of the calendar bezel to be populated with the highlighted time text, and the selected input field to be incremented to the next input field, which is 'end time'.

FIG. 12 shows the user executing a left-to-right swipe gesture over a free-text portion of the text to highlight the meeting venue, i.e. location, which logic in the calendar app recognizes as not matching the format of the currently selected input field, i.e. not being a time, and so selects one of the free-text input fields, namely the subject field since it is next in the bezel listing, which matches the format of the highlighted text. However, the user knows that "Conference Room A" is the venue, i.e. location, and not the subject of the calendar entry. Here we also note that it is convenient if the application provides an additional gesture by which a user is able to adjust a marked text portion created with the swipe gesture, either to make it bigger, smaller or to move it. For example, as is conventional, a marked text portion may be adjusted in a multitouch touchscreen using a two-finger pinch gesture; typically executed with thumb and forefinger, or thumb and middle finger.

FIG. 13 shows the situation after the user realizes that the selected input field ('subject') does not correspond to the highlighted text ('location text'). He then taps the desired input field icon for 'location'. The application may be configured to interpret an input field selection through a tap on the bezel as a trigger to populate the newly selected input field with the currently marked text (as illustrated). Alternatively, the application may be configured solely to act on the tap on the input field as a command to select that input field, and then wait for a further command for populating the selected field, namely the down-swipe gesture described above (or some alternative equivalent command such as a voice command).

Figure 14:
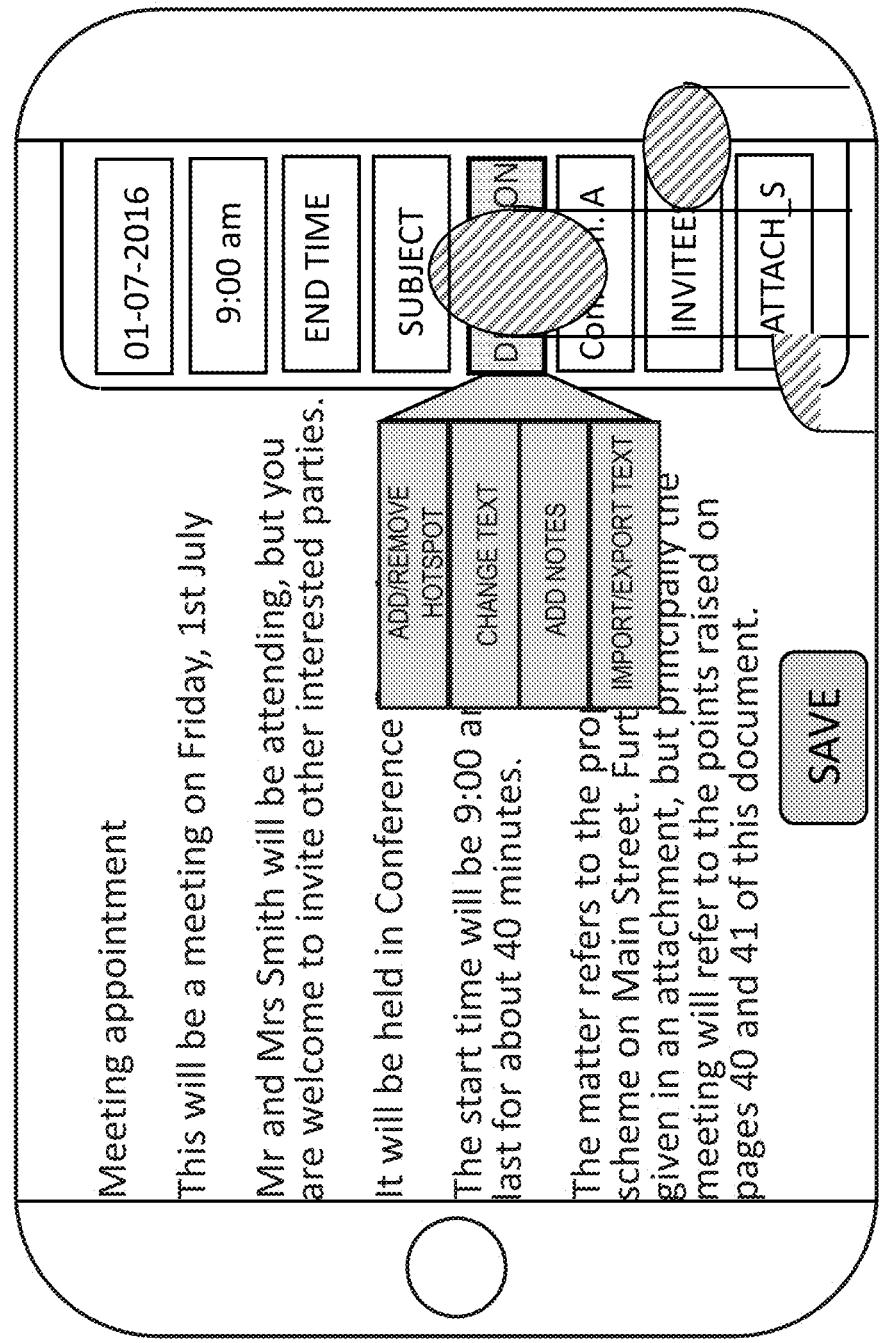
FIG. 14 shows, in accordance with an embodiment, the user touching and holding an input field icon ('description'), which after a threshold touch time causes a sub-menu to be displayed in which other options associated with the touched input field are listed.

FIG. 14 shows the user touching and holding an input field icon ('description'), which after a threshold touch time causes a sub-menu to be displayed in which other options associated with the touched input field are listed. The hold is a prolonged touch on the touchscreen of a particular input field, sustained beyond a threshold time (which is longer than any threshold time for the tap used for selecting the calendar entry input field). It is noted the sub-menu options are a mixture of extra input fields (add notes), other actions related to populating input fields (change text, import text) and other actions (add/remove a hotspot link, e.g. to a specific point in a text, export text).

Figure 15:
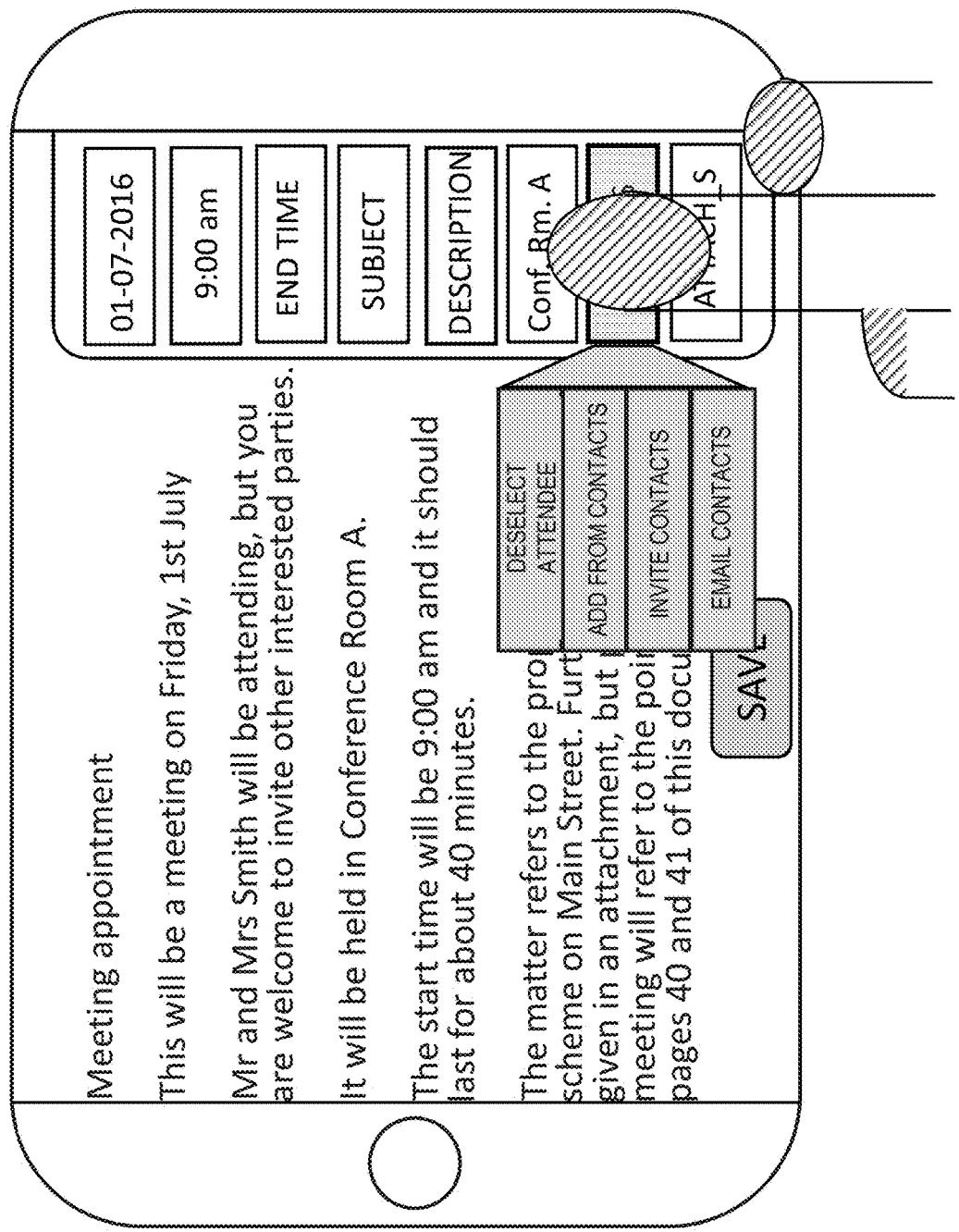
FIG. 15 shows, in accordance with an embodiment, the user touching and holding an input field icon ('invitees'), which after a threshold touch time causes a sub-menu to be displayed in which other options associated with the touched input field are listed.

FIG. 15 shows the user touching and holding an input field icon ('invitees'), which after a threshold touch time causes a sub-menu to be displayed in which other options associated with the touched input field are listed. This is presented as a further example of a sub-menu. It is envisaged that some, but most likely not all of the input fields have sub-menus depending on logical design choice of the programmer.

Another use of a prolonged hold might be on the 'end time' input field. If the start time is populated a prolonged hold of the end time icon may be interpreted to toggle from 'END TIME' to 'DURATION' in the sense of event duration. In this way, if the text does not indicate an end time, but indicates the event duration (e.g. in the free text it states " . . . and we expect 1 hour should be more than sufficient to discuss everything . . . "), the user can mark the text indicating the meeting duration and populated the end time field based.

With reference to the above figures, it will thus be understood that the application is configured so that input fields that are populated display their content, whereas input fields that are not yet populated display an indication of its designation, e.g. its field name, e.g. SUBJECT, or a blank format, e.g. a blank date format such as 'DD-MM-YY'.

Having now given a functional overview of how the calendar application facilitates entry of new events, we now describe the process flow with reference to various flow diagrams.

Figure 16A:
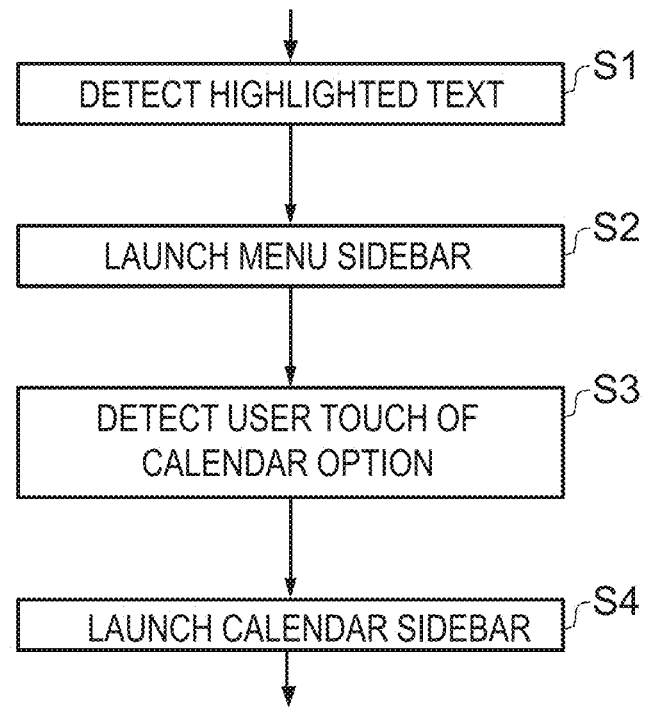
FIG. 16A is a flow diagram showing, in accordance with an embodiment, steps which launch the calendar app through a menu as illustrated in FIGS. 3 to 7 above.

FIG. 16A is a flow diagram showing steps which launch the calendar app through a menu as illustrated in FIGS. 3 to 7 above. In Step S1, the application detects that text has been highlighted with a swipe gesture. In Step S2, which is triggered by Step S1, the menu sidebar or bezel is launched which includes a calendar option. In Step S3, a user touch (i.e. tap) of the calendar icon is detected which triggers, in Step S4, the calendar sidebar or bezel to be launched. An alternative launch option might be that, when the calendar sidebar is not currently on the display, the sequential actions of highlighting some marked text and then executing the down-swipe gesture across it are interpreted to be a command to display the calendar sidebar, i.e. launch the calendar application.

Figure 16B:
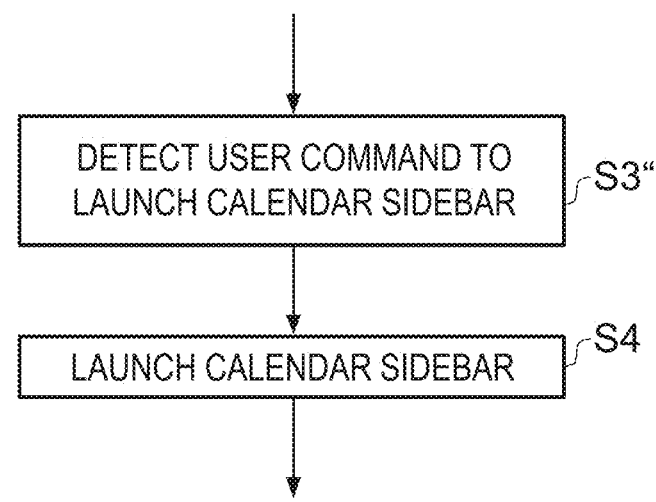
FIG. 16B is a flow diagram showing, in accordance with an embodiment, steps which provide an alternative for launching the calendar app directly.

FIG. 16B is a flow diagram showing steps which provide an alternative for launching the calendar app directly in Step S4" in response to detection of an associated user command in Step S3". This may for example be a voice command or a shortcut on the home screen of the computing device which allows the calendar app to be launched directly from the home screen without the intermediate step of the menu sidebar.

Figure 17:
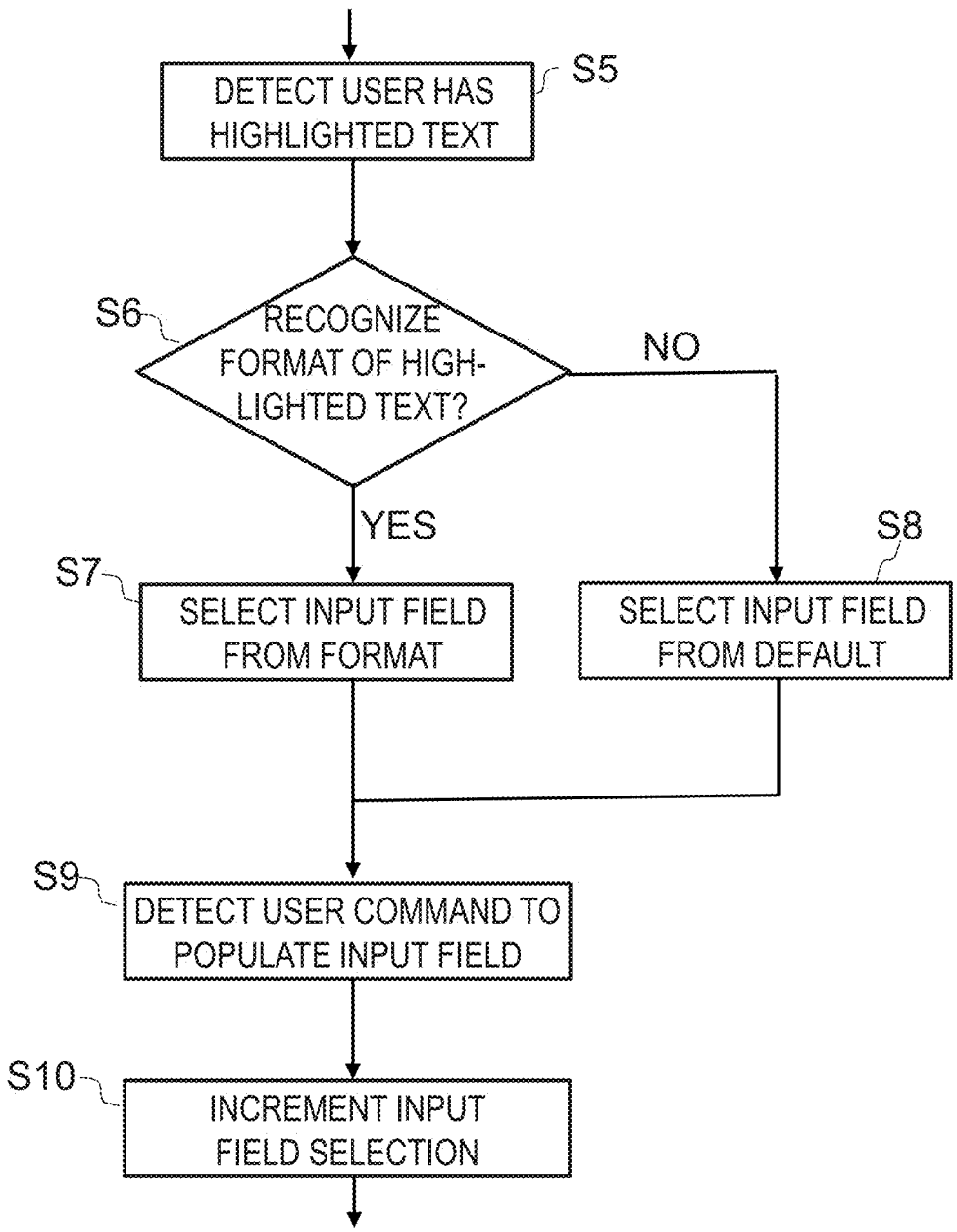
FIG. 17 is a flow diagram showing, in accordance with an embodiment, steps for populating an input field of an appointment the calendar app through a menu, for example as illustrated in FIGS. 9 to 11 above.

FIG. 17 is a flow diagram showing steps for populating an input field of an appointment the calendar app through a menu, for example as illustrated in FIGS. 9 to 11 above.

In Step S5, the application detects that a user has highlighted a text portion, e.g. with a swipe gesture in the text flow direction. In Step S6, the application assesses the format of the marked text and tries to associate it with the formatting requirements of one or more input fields. Formats include date and free text. Other formats may be hyperlinks and email addresses. In Step S8, if no format is recognized, then the application applies default logic to select a field. The logic may simply specify the first, as-yet unpopulated field in the displayed list of fields. In Step S7, if a format is recognized, then an as-yet unpopulated input field matching that format is selected if one exists. If not, then the logic of Step 38 is applied. If only one exists, then that field is selected. If multiple candidates exist, then the logic (or other logic) is applied to select between them.

In Step S9, a user command to populate the currently-selected input field with the marked text is detected and, subject to a match, actioned. Following population of the field in Step S9, the selected input field is incremented in Step S10.

The calendar entry can then be completed as far as possible by iterating the steps of FIG. 17. It will be understood that in some cases not all fields will be able to be populated from the text, since that depends on the information content of the text and also how the user wishes to specify the event. For example, the text may not specify a meeting end time (or duration). The application can thus present the user with conventional input means (e.g. keypad, keyboard, voice command) to complete the field population. Here it is also noted that as an alternative to looking for another input field with matching format when the highlighted text does not match the formatting requirements of the currently selected input field, the application could be configured to present the user with alternative input means (e.g. keypad, keyboard, voice command) so that the user can populate the currently selected input field as desired.

It is further noted that the application can be programmed to recognize if the marked text corresponds to a time range (e.g. "3 to 4 o'clock") in which case this could be interpreted to be the start and end time of the calendar entry and both fields could be simultaneously selected and both fields simultaneously populated by the down-swipe gesture.

Figure 18:
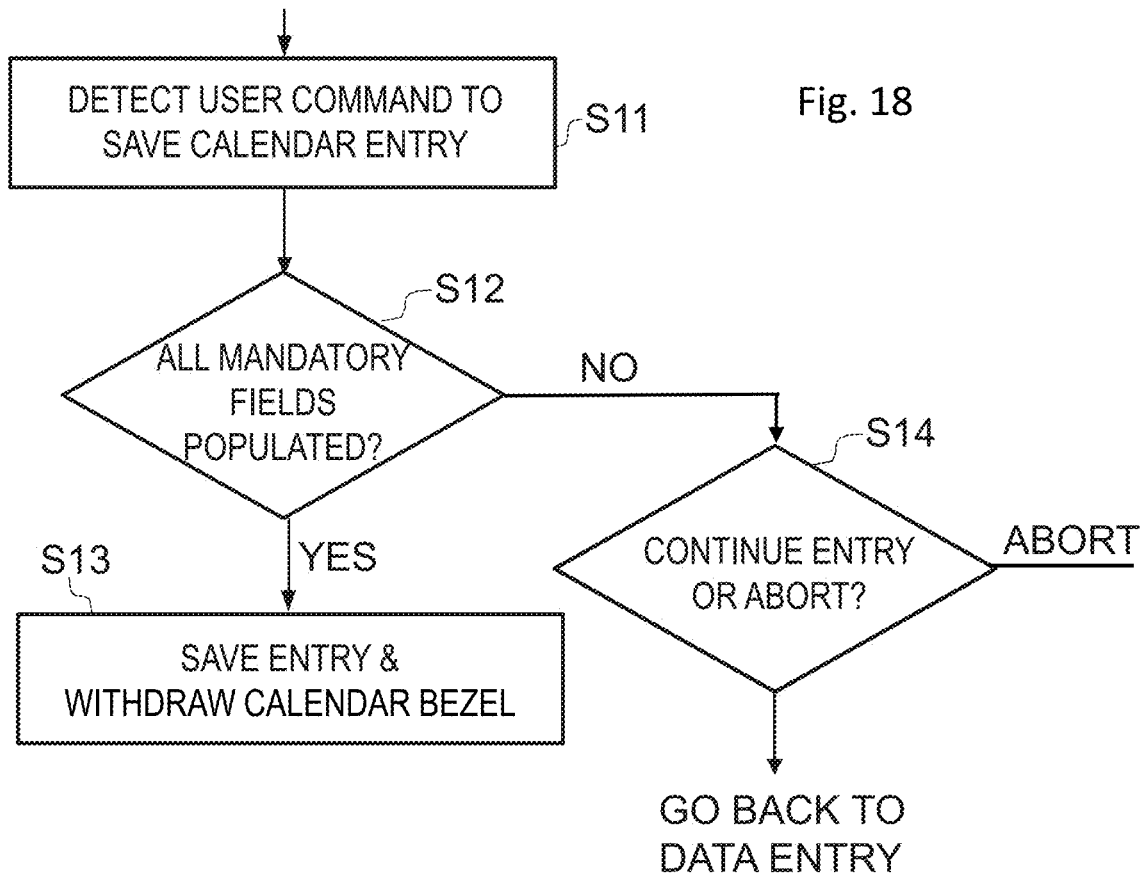
FIG. 18 is a flow diagram showing, in accordance with an embodiment, steps for saving a calendar entry, i.e. appointment.

FIG. 18 is a flow diagram showing steps for saving a calendar entry, i.e. appointment. In Step S11, it is detected that a user has issued a command to save the calendar entry shown on the calendar sidebar. In Step S12, the application tests whether all mandatory fields are populated. If yes, in Step S13 the calendar entry is saved and the calendar bezel is removed from the display. Other associated actions would also be carried out at this time, such as notifying invitees. On the other hand, if not all mandatory fields are populated, then the user can be given the option of aborting the draft or continuing with the data entry to fill in the missing mandatory fields. If the option to continue is chosen, then the as-yet unpopulated mandatory field(s) can be highlighted in some way in the calendar bezel, e.g. with a prominent color such as red, and one of these missing fields selected.

Figure 19:
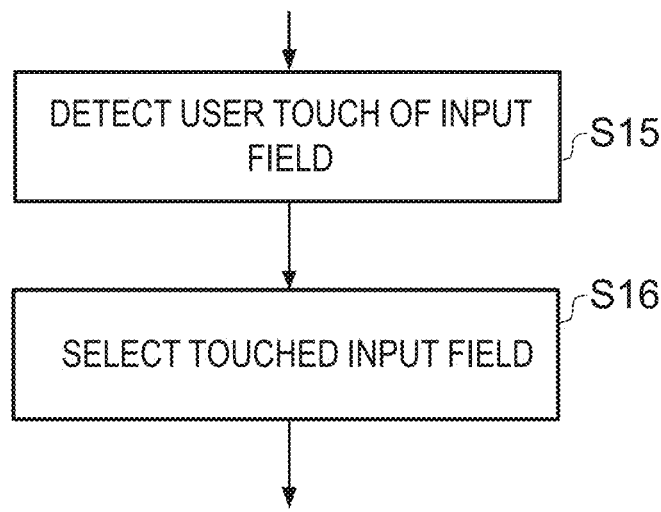
FIG. 19 is a flow diagram showing, in accordance with an embodiment, the steps by which a user touch of an input field icon in the calendar bezel results in that input field being selected.

FIG. 19 is a flow diagram showing the steps by which a user touch of an input field icon in the calendar bezel in Step S15 results in that input field being selected in Step S16, as illustrated in FIG. 13.

Finally, it is noted that the down-swipe gesture referred to above could be changed to an up-swipe gesture crossing the marked text with no other change of functionality. That is, more generally, the crossing gesture could be crossing in either crossing direction, or if preferred the application could be configured to accept both crossing directions. Other gestures could be used for the same function, but it is considered that the combination of marking text with one gesture, which results in an elongate marked region followed by a swipe gesture crossing the elongate marked region is highly intuitive, especially in the case of a swipe in the direction of flow of the text for marking followed by a down-swipe crossing the marked text for populating.

Figure 20:
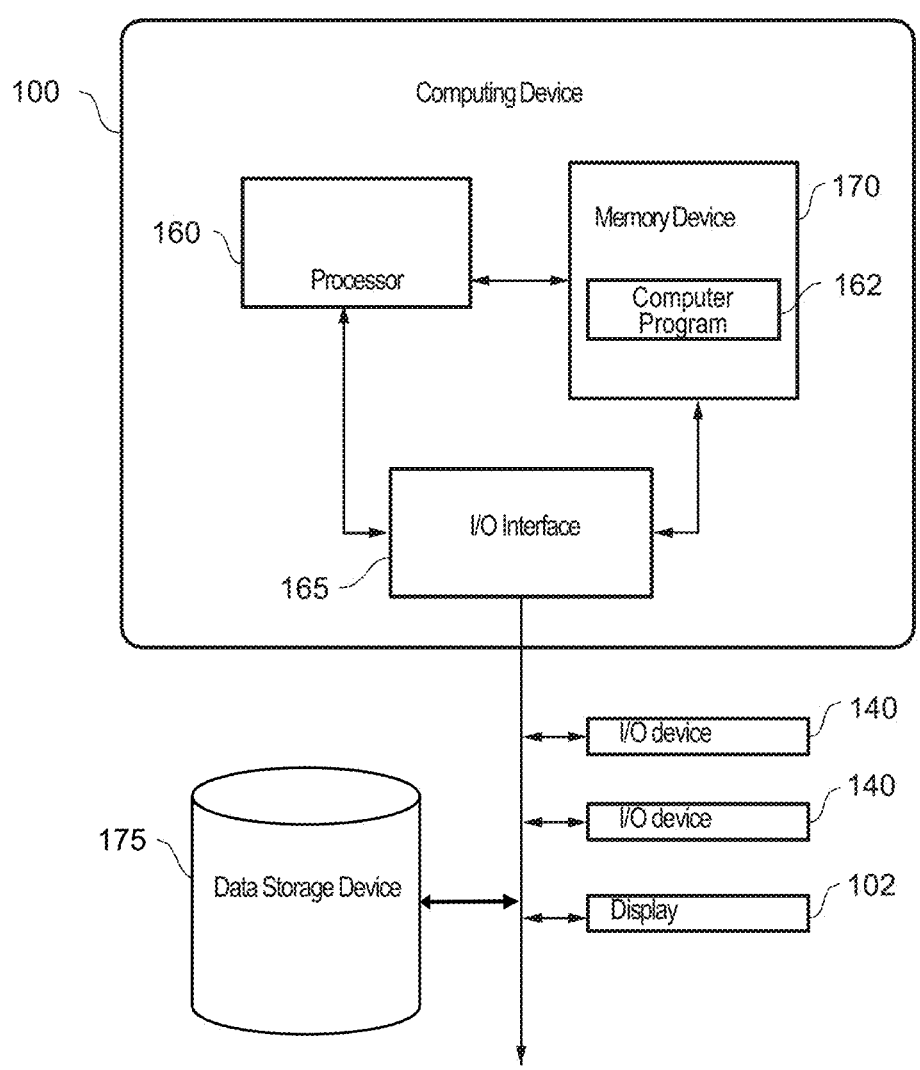
FIG. 20 shows a generic computer device.

FIG. 20 shows a structure of a computing device 100 and computer program 162 that may be used to implement methods and systems embodying the present invention. The computing device 100 comprises a processor 160 coupled through one or more I/O Interfaces 165 to one or more hardware data storage devices 175 and one or more I/O devices 140, which can manage graphic object requests, and a display 102 on which the graphics objects can be displayed. The processor 160 may also be connected to one or more memory devices 170. At least one memory device 170 contains stored computer program 162, which is a computer program that comprises computer-executable instructions. The data storage devices 175 may store the computer program 162. The computer program 162 stored in the storage devices 175 is configured to be executed by processor 160 via the memory devices 170. The processor 160 executes the stored computer program 162.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program operable to, when deployed into a computer infrastructure and executed thereon, cause the computing device to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in the above detailed description, we have described a calendar application executable on a computing device having a touchscreen, a memory and a processor. The calendar application stores calendar entries, each entry being defined by a plurality of input fields. The application provides a method for making calendar entries on the touchscreen from a passage of text displayed in another application, such as a message displayed in a mail application. Input fields for a new calendar entry are populated by marking a relevant text portion using a first gesture and then using a second gesture in the form of a swipe crossing the marked text to populate the currently selected input field. The user can thus go through the text marking text and populating the input fields as far as possible using this combination of gestures, completing any missing fields not referred to in the text by conventional input methods.

It will be clear to one skilled in the art that many improvements and modifications can be made to the foregoing exemplary embodiment without departing from the scope of the present disclosure.

What is claimed is:

1. An application executable on a computing device having a display, a memory and a processor, the application being operable to:
  display on the display multiple lines of text in another application;
  display on the display in conjunction with the multiple lines of text in the another application a plurality of application selections in response to a detecting of a first user interface command;
  create, in response to a selection of a selected application from the plurality of application selections, a blank record having a plurality of unpopulated input fields corresponding to the selected application; and
  populate the input fields in the record through:
    detecting the first user interface command which the processor interprets as a command to mark a text portion extending along at least part of at least one line of the text;
    selecting a selected input field from the plurality of unpopulated input fields;
    detecting a second user interface command which the processor interprets as a command to populate the selected input field based on the marked text portion, the second user interface command being a swipe perpendicular to the direction of flow of a line of the text that is independent of a location of the selected input field;
    iterating the detecting of the first and second user interface commands;
    detecting a third user interface command to save the record; and
    saving the record.

2. The application of claim 1, wherein the display is a touchscreen and wherein the second user interface command is a gesture.

3. The application of claim 2, wherein the second user interface command is a swipe in a direction that crosses the marked text portion.

4. The application of claim 1, wherein the application is a database application, the record is one of a plurality of records saved in the database.

5. The application of claim 4, wherein the application is a calendar application, the database of records is a calendar, and each record is a calendar entry.

6. The application of claim 1, wherein the display is a touchscreen and wherein detection of at least one of the first and second gestures causes the application to additionally display on the display the plurality of input fields.

7. The application of claim 6, wherein the processor is operable to visually indicate which of the input fields is currently designated as being the next to populate.

8. The application of claim 1, wherein each of the input fields has a formatting requirement, wherein detecting the second user interface command triggers the processor to populate the currently selected input field, conditional on the marked text portion being compatible with the formatting requirement of the currently selected input field.

9. The application of claim 8, wherein, if following a second user interface command the processor determines that the marked text portion is not compatible with the formatting requirement of the currently selected input field, then the processor searches for an unpopulated input field that is compatible, and if there is one, selects that input field.

10. The application of claim 1, wherein, during iterating the detecting of the first and second user interface commands for populating the input fields, the processor is operable such that ones of the input fields that are populated display their content, and one of the input fields that are not populated display a prompt for input.

11. The application of claim 1, wherein the display is a touchscreen and detection of a tap on the touchscreen of a particular input field selects that input field.

12. The application of claim 11, wherein detection of a sustained touch on the touchscreen of a particular input field, sustained beyond a threshold time, causes display of a submenu for that input field providing further options.

13. The application of claim 1, wherein the first user interface command is a gesture.

14. The application of claim 13, wherein the first user interface command is a swipe in the direction of flow of a line of the text that is interpreted as a command to mark the text portion coincident with the swipe.

15. A method executed on a computing device having a display, a memory and a processor, the method comprising:
displaying on the display multiple lines of text in an application;
displaying on the display in conjunction with the multiple lines of text in the application, a plurality of application selections in response to a detecting of a first user interface command;
creating, in response to a selection of a selected application from the plurality of application selections, in the selected application a blank record having a plurality of unpopulated input fields corresponding to the selected application; and
detecting the first user interface command which causes the processor to mark a text portion extending along at least part of at least one line of the text;
selecting a selected input field from the plurality of unpopulated input fields;
detecting a second user interface command which causes the processor to populate the selected input field based on the marked text portion, the second user interface command being a swipe perpendicular to the direction of flow of a line of the text that is independent of a location of the selected input field
iterating the detecting of the first and second user interface commands;
detecting a third user interface command to save the record; and
saving the record.

16. The method of claim 15, wherein the display is a touchscreen and wherein at least one of the first user interface command and the second user interface command is a gesture.

17. The method of claim 16, wherein the first user interface command is a swipe in the direction of flow of a line of the text that is interpreted as a command to mark the text portion coincident with the swipe, and wherein the second user interface command is a swipe in a direction that crosses the marked text portion.

18. A computer program product stored on a computer readable medium and loadable into the internal memory of a digital computer, comprising software code portions, when said program is run on a computer, for performing the method of:
displaying on the display multiple lines of text in an application;
displaying on the display in conjunction with the multiple lines of text in the application, a plurality of application selections in response to a detecting of a first user interface command;
creating, in response to a selection of a selected application from the plurality of application selections, in the selected application a blank record having a plurality of unpopulated input fields corresponding to the selected application; and
detecting the first user interface command which causes the processor to mark a text portion extending along at least part of at least one line of the text;
detecting a second user interface command which causes the processor to populate the selected input field based on the marked text portion, the second user interface command being a swipe perpendicular to the direction of flow of a line of the text that is independent of a location of the selected input field;
iterating the detecting of the first and second user interface commands;
detecting a third user interface command to save the record; and
saving the record.

19. The computer program product of claim 18, wherein the display is a touchscreen and wherein at least one of the first user interface command and the second user interface command is a gesture.

* * * * *